United States Patent [19]

Choi

[11] Patent Number: 5,754,637
[45] Date of Patent: May 19, 1998

[54] COLLECTIVE HOUSE INTERPHONE SYSTEM AND METHOD THEREFORE

[75] Inventor: Young-Gon Choi, Suwon, Rep. of Korea

[73] Assignee: SamSung Electronics Co., Ltd., Suwon, Rep. of Korea

[21] Appl. No.: 622,276

[22] Filed: Mar. 27, 1996

[30] Foreign Application Priority Data

Apr. 17, 1995 [KR] Rep. of Korea ............... 8999/1995

[51] Int. Cl.⁶ .......................... H04M 1/60; H04M 9/00; H04M 11/00; H04M 7/10
[52] U.S. Cl. .................. 379/167; 379/102.06; 379/170; 348/14
[58] Field of Search .................. 379/106.05, 103, 379/167, 168, 170, 102.06, 102.03, 102.02, 102.01, 177, 179, 180, 181; 348/6, 12, 13, 14, 15, 156; 455/402, 463, 5.1, 3.1, 509, 14

[56] References Cited

U.S. PATENT DOCUMENTS

| | | | |
|---|---|---|---|
| 3,376,506 | 4/1968 | Sontag | 379/167 |
| 3,484,561 | 12/1969 | Matthews . | |
| 3,532,820 | 10/1970 | Holm | 379/167 |
| 3,665,116 | 5/1972 | Holstrom . | |
| 3,709,629 | 1/1973 | First . | |
| 3,767,859 | 10/1973 | Doering et al. . | |
| 3,806,662 | 4/1974 | Forrest | 379/167 |
| 4,224,476 | 9/1980 | Tuhy, Jr. | 379/181 |
| 4,524,384 | 6/1985 | Lefkowitz et al. | 379/102.06 |
| 4,538,031 | 8/1985 | Benning et al. | 379/102.06 |
| 4,544,111 | 10/1985 | Armstrong | 379/102.06 |
| 4,715,060 | 12/1987 | Lipscher et al. | 379/102.06 |
| 4,829,560 | 5/1989 | Evanyk et al. | 379/106.11 |
| 4,843,461 | 6/1989 | Tatsumi et al. | 379/102.06 |
| 4,943,997 | 7/1990 | Chang | 379/102.06 |
| 5,086,385 | 2/1992 | Launey et al. | 379/102.01 |
| 5,086,485 | 2/1992 | Bowen | 379/180 |
| 5,287,398 | 2/1994 | Briault | 379/102.01 |
| 5,315,644 | 5/1994 | Lester et al. | 379/103 |
| 5,390,240 | 2/1995 | Sensney | 379/102.01 |
| 5,428,388 | 6/1995 | Von Bauer et al. | 379/102.06 |
| 5,592,540 | 1/1997 | Beveridge | 379/177 |
| 5,598,456 | 1/1997 | Feinberg | 379/42 |
| 5,610,975 | 3/1997 | Tsuchida | 379/102.07 |
| 5,612,994 | 3/1997 | Chen | 379/167 |
| 5,636,263 | 6/1997 | Thomson | 379/102.07 |
| 5,657,380 | 8/1997 | Mozer | 379/88 |

*Primary Examiner*—Curtis Kuntz
*Assistant Examiner*—Rexford N. Barnie
*Attorney, Agent, or Firm*—Robert E. Bushnell, Esq.

[57] ABSTRACT

A collective house controller for relaying a call and guarding the houses is provided, in a collective house including a plurality of blocks separated from each other, each block including a plurality of households. The collective house controller includes a household interphone, i.e., intercom, for requesting/responding to a call while being connected with a first coaxial line and for performing a call by receiving a predetermined communication channel allocated thereto, a public entrance interphone for opening/closing a public entrance and transmitting an image signal, a gate guard post interphone for controlling opening/closing of the public entrance by checking a visitor in front of the corresponding public entrance, a block controller for relaying a call within a block by allocating a communication channel after receiving a predetermined communication channel allocated thereto while being connected with first and second coaxial lines, and a central controller for relaying a call between blocks by allocating a communication channel to the block controller while being connected with the second coaxial line. Thus, wiring and the maintenance thereof can be easily performed, simultaneous conference call can be provided and information can be transmitted and received.

39 Claims, 8 Drawing Sheets

COLLECTIVE HOUSE INTERPHONE SYSTEM AND METHOD THEREFORE

CROSS REFERENCE TO RELATED APPLICATIONS

This application makes reference to, incorporates the same herein, and claims all benefits accruing under 35 U.S.C §119 from an application entitled Collective House Controller For Relaying Calls And Guarding The House earlier filed in the Korean Industrial Property Office on 17 Apr. 1995, which was duly assigned Serial No. 95-8999 by that Office.

BACKGROUND OF THE INVENTION

The present invention relates to a collective house interphone system and method therefore, and more particularly, to a process and circuit for controlling a collective house interphone controller using a coaxial line for relaying calls and guarding the house.

Generally, a collective house (e.g., an apartment building or office building) requires communication lines for calling between a gate guard post and a particular household and disseminating official announcements by way of audio transmission.

The construction of a conventional collective house interphone system often uses a plurality of lines between the interphones, i.e., intercoms, of each household (1 to aN) and a gate guard post controller, of which two wires are for calls, with an additional line required for collective announcements. With this type of system, a call among many households or a call between households in the collective units can not be simultaneously made. Such a call is possible only when the call is manually relayed by a concierge who is permanently stationed at the gate guard post. Particularly, in the case of a terraced apartment that is a collective unit (having entrances for two households), a concierge is required for every entrance. This conventional collective house controller is also used to transmit simple information (related to elevator control, emergencies or power outages).

I have noticed that this type of conventional collective house controller requires wiring that is difficult to install and construction costs that are high since two or more lines are required between each household and the gate guard post. Secondly, I have found that maintenance is difficult, and therefore costly, due to the many wires. Thirdly, conference calls are impossible and incur additional costs if alternative, albeit temporary arrangements are made to accommodate a conference call. Fourthly, a concierge needs to be permanently stationed at the gate guard post for relaying calls, an unnecessary expense.

The use of interphones or intercoms in apartment buildings is found in Matthews, U.S. Pat. No. 3,484,561, which discloses an Apartment Telephone-Intercom And Door Release System with which a tenant of the apartment building is able to use the apartment's telephone and telephone line to place/receive telephone calls, receive intercom calls and control release of a foyer entrance door. Holstrom, U.S. Pat. No. 3,665,116, discloses an Apartment House Intercom System which uses two wires to communicate between a central station (foyer) and one or more of a plurality of remote stations (apartments). The same two wires are used to transmit a door unlatching signal from and apartment to the foyer. First, U.S. Pat. No. 3,708,629, discloses an Intercommunication System For Apartment, Office Building And The Like which uses a pair of audio lines common to each apartment to communicate with a central station having a front lobby and a rear lobby, a pair of control lines common to each apartment for operating a door latch in either the front or rear lobby and a plurality of individual signal lines equal in number to the plurality of apartments for transmitting a tone signal to a respective apartment indicating a call being placed from one of the lobbies to the apartment.

Another use for interphones or intercoms other than in an apartment building is found in Doering et al., U.S. Pat. No. 3,767,859, which discloses a Hospital Communication System which uses a single coaxial cable to transmit audio and physiological data between each remote site (hospital room) to a central site (nursing station). When a call it to be placed to a patient's room, a carrier frequency is modulated with address data of the desired room, such address data being demodulated/decoded by circuitry in the desired room. When a call is to be placed from a patient's room to the nursing station, the address data of the patient's room modulates a second carrier frequency generated by circuitry in the patient's room, such address data being demodulated/decoded at the nursing station to indicate which room is making the call. Third, fourth, etc. individual carrier frequencies are provided to respective rooms for the transmission of physiological data preceded by address data from each patient's room to the nursing station.

SUMMARY OF THE INVENTION

It is an object of the present invention to provide an improved collective house controller.

It is another object to provide a collective house controller using coaxial lines.

It is still another object to provide a process and circuit for a collective house controller that facilitates construction and installation of wiring.

It is yet another object to provide a process and circuit able to easily relay, transmit and receive a variety of information.

It is an another object of the present invention to provide a collective house controller for guarding a house, by which conference calls and call relaying for transmitting and receiving household information can be performed using a coaxial line.

To achieve the first object of the present invention, there is provided a collective house controller for relaying a call within a block or between blocks, in a collective house including a plurality of blocks separated from each other, each block includes a plurality of households. The circuit for the controller may be constructed first and second coaxial lines a household interphone installed in each household, for transmitting and receiving a plurality of first control signals via the first coaxial line so as to request and respond to a call, and performing the call via a predetermined communication channel allocated thereto. At least one block controller may be installed in each block and connected with the first and second coaxial lines, in order to, after receiving communication channels allocated thereto by transmitting and receiving a plurality of second control signals via the second coaxial line, relay the call between blocks by allocating a predetermined communication channel which is not in use among the allocated communication channels to the corresponding household interphone in response to a request for a call relay between blocks and, in response to the first control signals of the household interphone, to relay the call within the block by allocating a predetermined communication channel which is not in use to the household interphone when there is a request for a call relay within the block, and in order to request the call between blocks by outputting the second control signals when there is a request for a call relay between blocks. A central controller connected with the second coaxial line, may be used to allocate predetermined numbers of communication channels in response to a communication channel allocation request of the block controller, and to relay the call between blocks by allocating the remaining non-allocated communication channels in response to a request for the call relay between blocks of the block controller, by transmitting or receiving the second control signals via the second coaxial line.

To achieve the second object of the present invention, there is provided a collective house controller for guarding a collective house including a plurality of blocks separated from each other, public entrances commonly used by a plurality of households and gate guard posts for supervising each block, each block including the plurality of households. The controller may be constructed with first and second coaxial lines; a household interphone installed in each household and connected with the first coaxial line, for requesting or responding to a call, and for performing a call by receiving a predetermined communication channel allocated thereto, by transmitting or receiving a plurality of first control signals via the first coaxial line. At least one public entrance interphone may be installed at the public entrances and connected with the first coaxial line, for requesting or responding to a call, for performing a call by having a predetermined communication channel allocated thereto, for transmitting an image signal of a visitor using a predetermined video channel, and for opening or closing the public entrances in response to a third control signal, by transmitting or receiving a plurality of first control signals via the first coaxial line. At least one block controller may also be installed in each block and, connected with the first and second coaxial lines, in order to, after receiving communication channels allocated thereto by transmitting or receiving a plurality of second control signals via the second coaxial line, relay a call between blocks by allocating a predetermined communication channel which is not in use among the allocated communication channels to the household or public entrance interphone in response to a request for a call relay between blocks, relay a call within a block by allocating a predetermined communication channel which is not in use when there is a request for a call relay within the block, to request a call between blocks by outputting the second control signals when there is a request for a call relay between blocks, in response to the first control signals of the household or public entrance interphone, and to relay the third control signal input thereto via the second coaxial line to the first coaxial line. At least one gate guard post interphone may be installed at each gate guard post and connected with the second coaxial line, to request or to respond to a call, to perform a call by having a predetermined communication channel allocated thereto, to display the image signal input thereto on a screen, and to generate the third control signal for opening and losing the public entrances, by transmitting or receiving the second control signals via the second coaxial line. A central controller may be connected with the second coaxial line, for allocating a predetermined number of communication channels in response to a communication channel allocation request of the block controller, for allocating a communication channel which is not in use in response to a communication channel allocation request of the gate guard post interphone, and for allocating a communication channel which is not in use in response to a request for the call relay between blocks of the block controller of the gate guard post interphone to relay call between blocks, by transmitting or receiving the second control signals via the second coaxial line.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Generally, a collective house, such as an apartment building, comprises a plurality of households grouped into a plurality of spatially separated blocks, and public entrances commonly used by several of the households. Also, there is a gate guard post at which a concierge is permanently stationed for supervising one or more of the blocks in the collective house.

Figure 1:
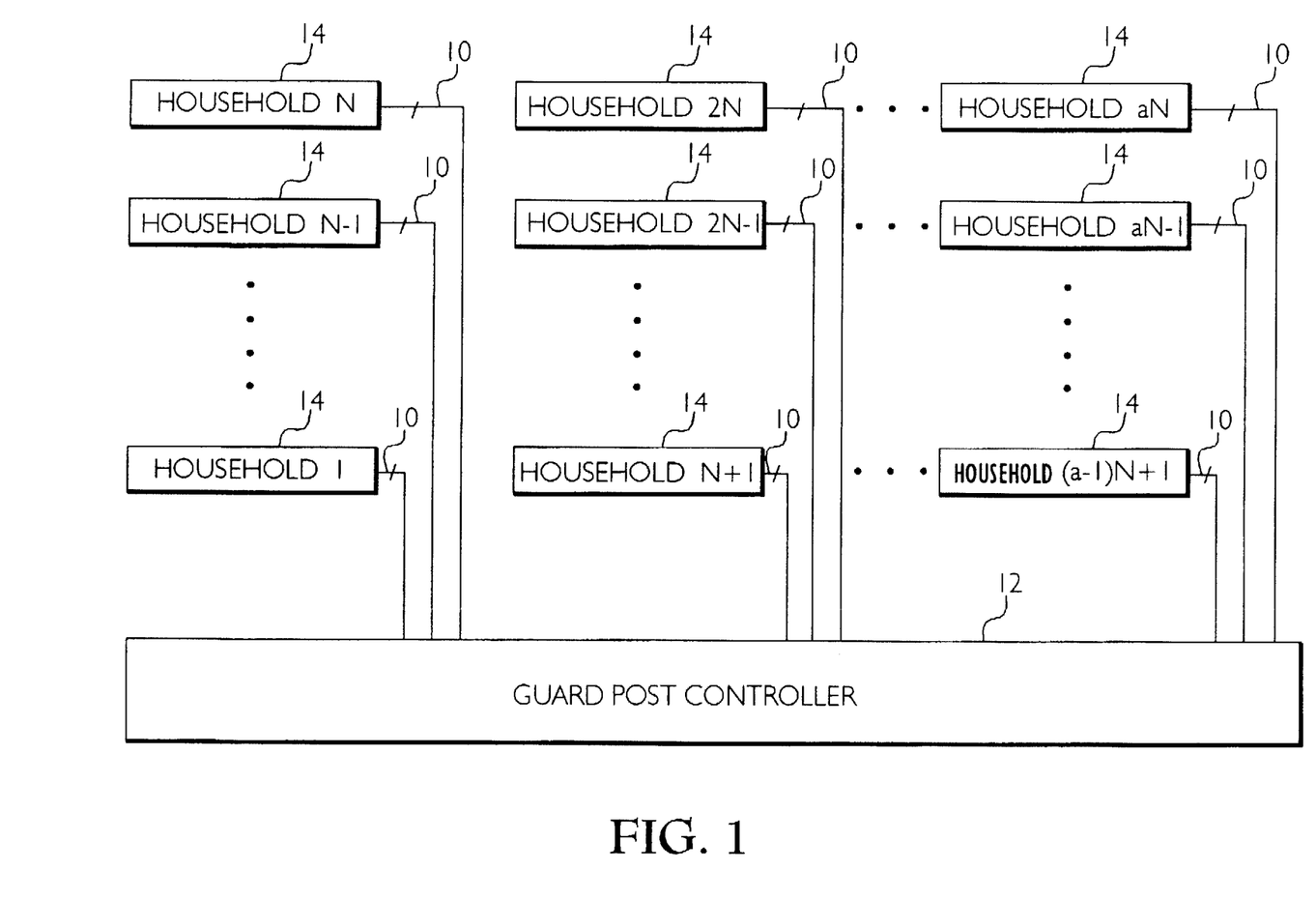
FIG. 1 is a block diagram providing an abstract representation of an exemplary illustration of some of the salient features of conventional controller for a collective house.

Turning now to the drawings, FIG. 1 is a diagram schematically illustrating the construction of a conventional collective house interphone system.

A plurality (1 to aN) of pairs of telephone lines 10 are installed between a guard post controller 12 and the aN individual interphones 14 (i.e., the intercoms) of the corresponding individual households within the collective. In each set of wires 10, two wires are for calls, and an additional wire is required for collective announcement from the gate guard post.

Figure 2:
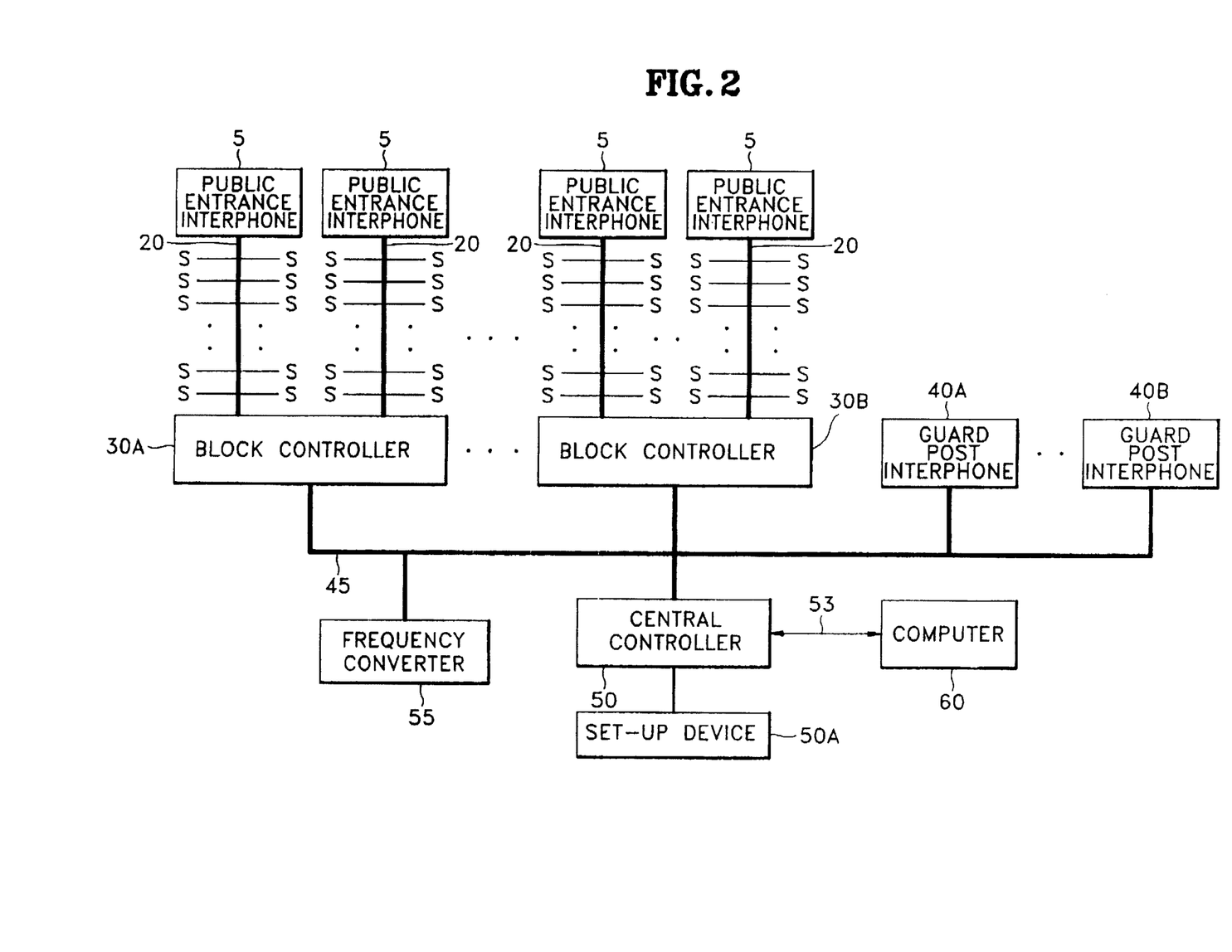
FIG. 2 is a block diagram of a collective house controller providing telecommunications relaying and residential security constructed according to the principles of the present invention.

Referring now to FIG. 2, a collective house controller constructed according to the principles of the present invention uses first and second single coaxial lines 20 and 45, a household interphone, i.e., intercom, S installed in each household of a stationary architectural structure such as a multi-unit residential apartment or cooperative dwelling constructed with several floors. The household interphones S are connected by first coaxial line 20 to a public entrance interphone 5 which is installed at each public entrance to be commonly used by a plurality of households, and to block controllers 30A and 30B for relaying calls between households in the same block. Block controllers 30A and 30B are connected by second coaxial line 45 to gate guard post interphones 40A and 40B which are preferably installed at the gate guard posts, and to a central controller 50 for relaying calls either within a block or between blocks by allocating communication channels. Central controller 50 is connected to a set-up device 50A for programming central controller 50, to a frequency converter 55, and to a local, dedicated processor such as computer 60.

Each public entrance interphone 5 is connected to a plurality of the household interphones S, installed at households which use the corresponding public entrance, via first coaxial line 20. Also, block controllers 30A and 30B, gate guard interphones 40A and 40B, and central controller 50 are connected to each other via second coaxial line 45. Here, a multiple frequency dividing communication method is used for enabling calls and information exchange using the coaxial lines. A plurality of frequency-allocated communication channels are required for enabling simultaneous conference calls and information exchange. For a collective house controller of the present invention, a given frequency band is divided into a transmission frequency band and a reception frequency band, and each band is again divided into a plurality of communication channels of predetermined bandwidth.

Figure 3:
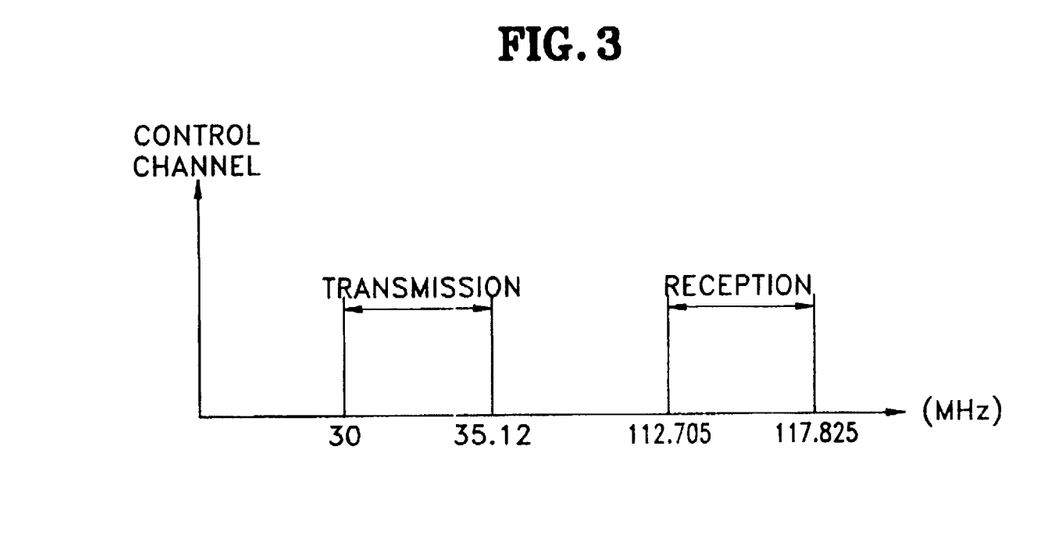
FIG. 3 is a frequency allocation diagram arranged for the practice of the present invention.

FIG. 3 is a frequency allocation diagram illustrating allocation of the spectrum according to the principles of the present invention. As shown in FIG. 3, when the transmission and reception frequency bands are set to 30–35.12 MHZ and 112.705–117.825 MHZ, respectively, and when the bandwidth for each channel is determined as 20 KHz, two hundred and fifty-six communication channels are available. Thus, the number of communication channels may be changed according to the determined frequency band and channel bandwidth. These two hundred and fifty-six communication channels use two respective control channels for transmission and reception of control data between each apparatus, and the transmission and reception communication channels each have one hundred an twenty-seven channels. That is, one hundred an twenty-seven call paths are formed. Here, central controller 50 polls each of block controllers 30A and 30B and gate guard posts 40A and 40B, in order to control the two hundred and fifty-four communication channels. That is, central controller 50 provides block information to the corresponding block controller using the transmission and reception control channels. At this time, a programming device 50A is used to set up such block information (see FIG. 2). Central controller 50 allocates a predetermined number of communication channels to block controllers 30A and 30B for relaying calls between households of the same block. When additional communication channels are required from block controllers 30A and 30B, central controller 50 additionally allocates a part of the remaining non-allocated communication channels to block controllers 30A and 30B. Central controller 50 and block controllers 30A and 30B use the transmission and reception control channels for transmitting and receiving control data. Block controllers 30A and 30B perform a control communication with public entrance interphones 5 and household interphones S using a carrier sense multiple access with collision detection (CSMA/CD) method adopting a baseband alternate mark inversion (AMI) waveform, for controlling the communication channels allocated from central controller 50. When calls in the same block are required from household interphones S, block controllers 30A and 30B perform the call relay in the same block by allocating the communication channels initially allocated from central controller 50 to household interphones S. For inter-block calls, block controllers 30A and 30B require central controller 50 to relay calls between blocks. Central controller 50 allocates an unused communication channel to the corresponding block controller, and the block controller reallocates this allocated communication channel to the corresponding household interphone so that the call relay between blocks is performed. Thus, intra-block calls and simultaneous conference calls can be performed by allocating the transmission and reception communication channels to the interphones for making and having the call. Frequency converter 55 is connected to second coaxial line 45 to convert an input 30 MHz transmission frequency band into an 117 MHz reception frequency band, and output the result. Each household interphone S detects various information of the corresponding household, such as a information regarding gas, electricity, fire, intrusion, etc., using sensors, converts the detected information to corresponding control data, transmits the data to the corresponding block controller via the control channel, and transmits again the transmitted data to central controller 50. Central controller 50 transmits the data to gate guard interphones 40A and 40B, thereby providing the detected information to the concierge at the gate guard post. Thus, the concierge can speak over the telephone with a household of the supervised block, a household of blocks supervised by other concierges, or another gate guard post, through a call relay by central controller 50, using gate guard interphones 40A and 40B. Also, the concierge can totally control various information of each household and take proper action according to the information. Computer 60 stores the information of each household to totally control the information therein, processes the information by transmitting and receiving information data to and from central controller 50, and exchanges the information via a communication network. Particularly, computer 60 can provide information for the safety of all households, to the proper authorities, by selectively outputting an audio signal pre-stored therein via a public telephone network, as required.

Figure 4:
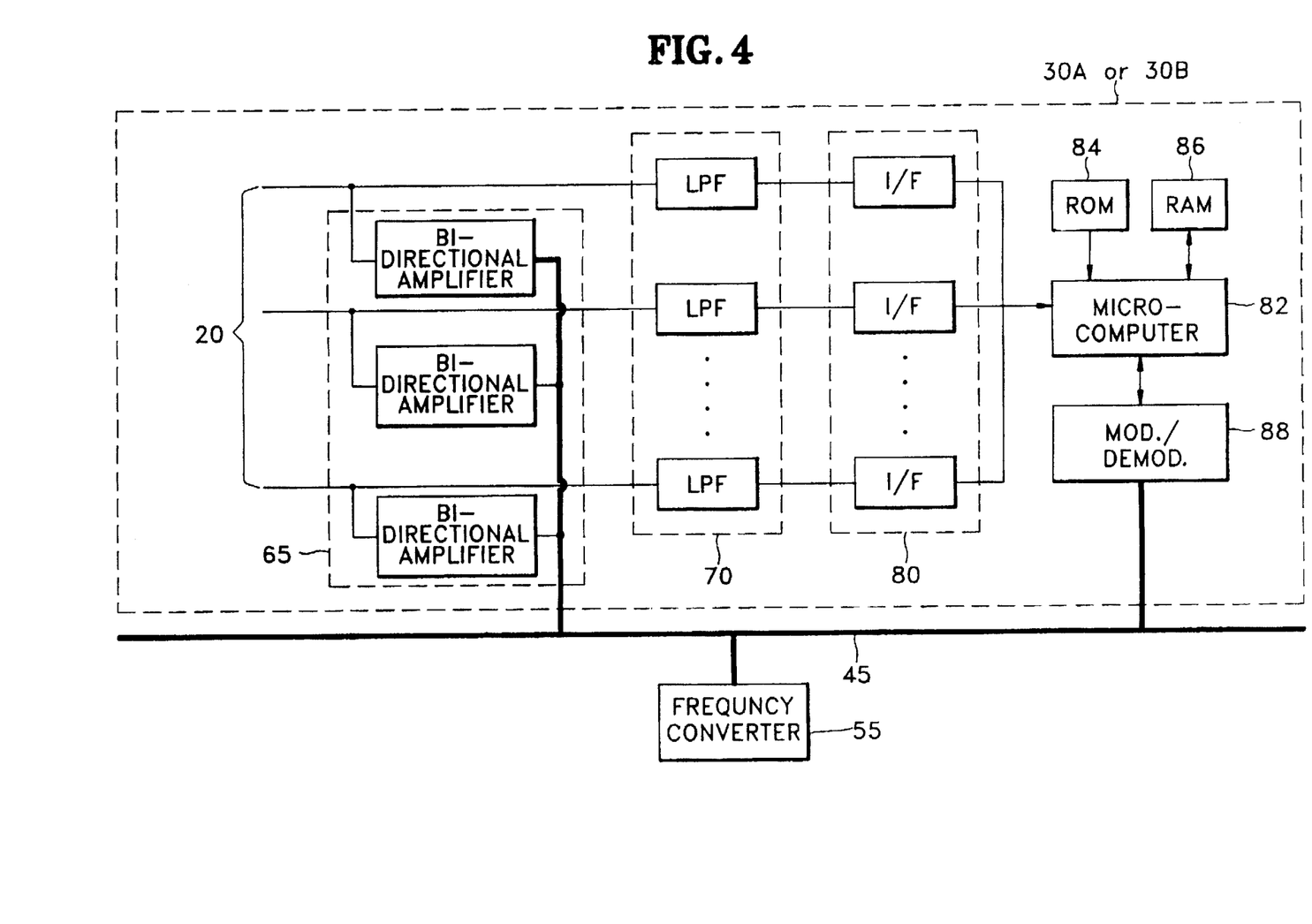
FIG. 4 is a detailed block diagram of the block controller of FIG. 2.

FIG. 4 is a detailed block diagram of a block controller 30A or 30B of FIG. 2. In FIG. 4, the block controller 30A or 30B is constructed with low-pass filters (LPF) 70, control channel interfaces (I/F) 80, a microcomputer 82, a ROM 84, a RAM 86, a modulator/demodulator 88, and bi-directional amplifiers 65. ROM 84 and RAM 86 are memories for storing the operating program of microcomputer 82, initial set-up data and data generated during program operation. Block controller 30A or 30B communicates with public entrance interphone 5 and household interphones S via first coaxial line 20 using the CSMA/CD method and a 9600 baud asynchronous serial baseband, to transmit and receive control data. Low-pass filters 70 filter low frequency band signals among signals input thereto via first coaxial line 20. Control channel interfaces 80 are arranged between low-pass filters 70 and microcomputer 82 to interface the input or output the control data. Here, low-pass filters 70 and control channel interfaces 80 correspond to each other, the numbers of which are determined according to the type of collective house. For example, for a collective house having three public entrances, three low-pass filers 70 and three control channel interfaces 80 are required, respectively. Modulator/demodulator 88 is connected between microcomputer 82 and second coaxial line 45 to modulate/demodulate the control data transmitted or received to or from central controller 50. That is, a 9600 baud asynchronous serial signal from microcomputer 82 is modulated into a 30 MHz transmission signal and a 117 MHz reception signal of central controller 50, received via second coaxial line 45, is demodulated into the 9600 baud asynchronous serial signal. Bi-directional amplifiers 65 are arranged between first and second coaxial lines 20 and 45 to amplify attenuated bi-directional signals, i.e., control signals and audio signals.

Figure 5:
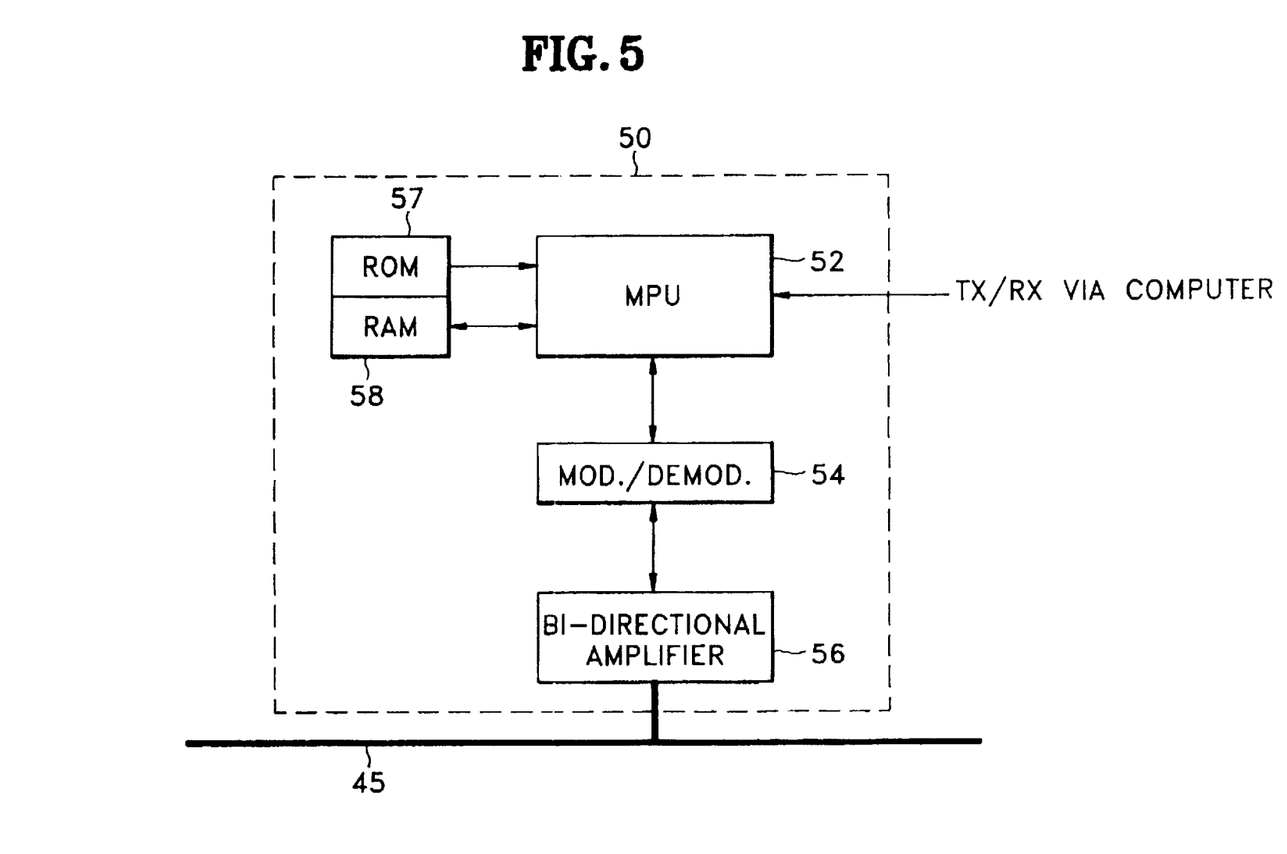
FIG. 5 is a detailed block diagram of the central controller of FIG. 2.

FIG. 5 is a detailed block diagram of central controller 50 of FIG. 2. Central controller 50 has a bi-directional amplifier 56 connected to second coaxial line 45, a modulator/ demodulator 54, a main processing unit (MPU) 52, a ROM 57, and a RAM 58.

Bi-directional amplifier 56 is for amplifying the level of a modulated/demodulated signal. Modulator/demodulator 54 modulates the 9600 baud asynchronous serial signal of MPU 52 into the 30 MHz transmitting signal and outputs the result to block controllers 30A and 30B and gate guard post interphones 40A and 40B via second coaxial line 45. Also, modulator/demodulator 54 demodulates the 117 MHz reception signal from second coaxial line 45 into the 9600 baud asynchronous serial signal and outputs the result to MPU 52. Thus, MPU 52 generates the 9600 baud asynchronous serial signal for performing the control operation in response to the 9600 baud asynchronous serial signal demodulated by modulator/demodulator 54 and outputs the generated signal to modulator/demodulator 54. Then, modulator/demodulator 54 modulates the signal output from MPU 52 and outputs the result via the 30 MHz transmission control channel. Here, the control operation is for allocating the communication channels of a predetermined number in response to a communication channel allocation request of block controllers 30A and 30B, and allocating the non-allocated communication channels in response to a request of block controllers 30A and 30B for call relaying between blocks. Also, when information of each household, particularly, related to an emergency state, is generated from block controllers 30A and 30B, MPU 52 transmits this information to the corresponding gate guard post interphone. As an example, it is supposed that there are household interphone S, block controller 30A for controlling a block and gate guard post interphone 40A. Information about an emergency state such as a fire, gas leakage and crime, or household situation such as absence or existence of person is transmitted to block controller 30A from household interphone S and the information is again transmitted to gate guard post interphone 40A installed in the gate guard post at which a concierge who controls block controller 30A is permanently stationed, via central controller 50. If a message is transmitted from public entrance interphone 5 or other household interphones S when no person is at home, the message is automatically transmitted to gate guard post interphone 40A so that the concierge can process the message. Central controller 50 receives and transmits communication data from and to computer 60 via communication line 53. ROM 57 and RAM 58 are memories for storing the operating program of MPU 52, initial set-up data and data generated during program operation.

Figure 6:
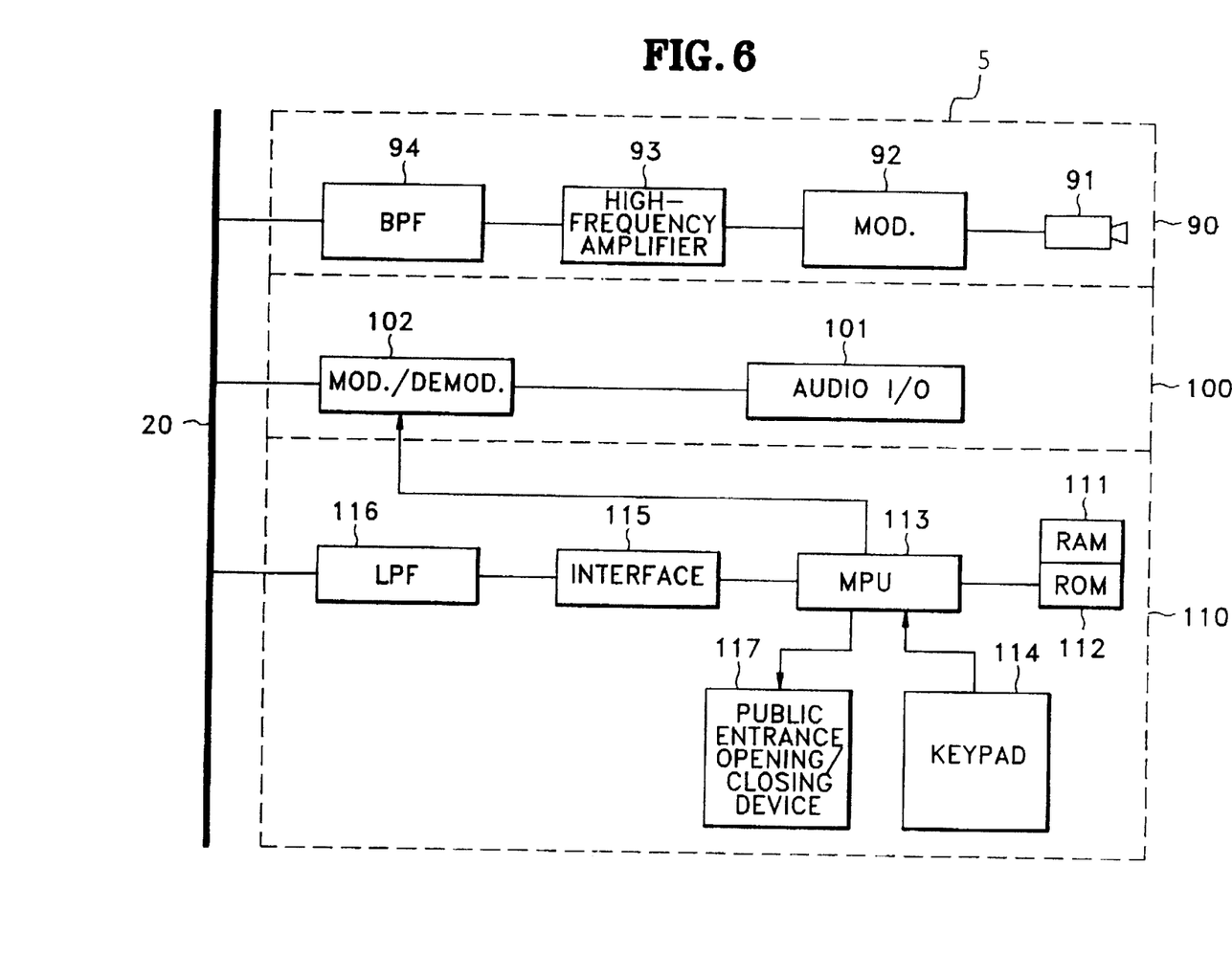
FIG. 6 is a detailed block diagram of the public entrance interphone of FIG. 2.

FIG. 6 is a detailed block diagram of public entrance interphone 5 of FIG. 2. The public entrance interphone comprises a video signal processor 90, an audio signal processor 100 and a control signal processor 110.

Video signal processor 90 modulates the image signal of a visitor into a predetermined frequency band and outputs the results to first coaxial line 20. That is, a camera 91 generates the image signal of the visitor and a modulator 92 modulates the image signal into a 3.55 MHz frequency band of a predetermined video channel. A high frequency amplifier 93 amplifies the modulated image signal, and the then amplified signal is output to first coaxial line 20 via a bandpass filter (BPF) 94.

Audio signal processor 100 sets up a communication channel according to phase-locked loop (PLL) data input from an MPU 113 and receives and outputs the audio signal via the set-up communication channel. First, a modulator/ demodulator 102 sets up the communication channel according to the PLL data from MPU 113 and demodulates only the audio signal corresponding to the set-up communication channel via first coaxial line 20 of the reception frequency band. An audio signal input/output device 101 converts the demodulated audio signal into sound and converts sound into an electrical audio signal. Next, the audio signal from audio signal input/output device 101 is modulated into the transmission frequency band of the set-up communication channel via modulator/demodulator 102 and output to first coaxial line 20.

Control signal processor 110 generates the PLL data for setting up the communication channel according to the 9600 baud asynchronous serial signal input via first signal coaxial line 20 and outputs the corresponding 9600 baud asynchronous serial signal for requesting a call to first coaxial line 20. Only the 9600 baud asynchronous serial signal from the corresponding block controller 30A or 30B among the signals input via first coaxial line 20 passes through a low-pass filter 116 and is input to MPU 113 via an interface 115. Here, MPU 113 generates the PLL data for setting up the communication channel in response to the 9600 baud asynchronous serial signal, outputs the generated PLL data to modulator/demodulator 102 and outputs a public entrance opening or closing signal to a public entrance opening or closing device 117 so as to open or close the public entrance. Also, MPU 113 generates the control data for the call request according to a key input signal of a keypad 114. Interface 115 generates the 9600 baud asynchronous serial signal corresponding to the control data and outputs the generated signal to first coaxial line 20 via low-pass filter 116.

Figure 7:
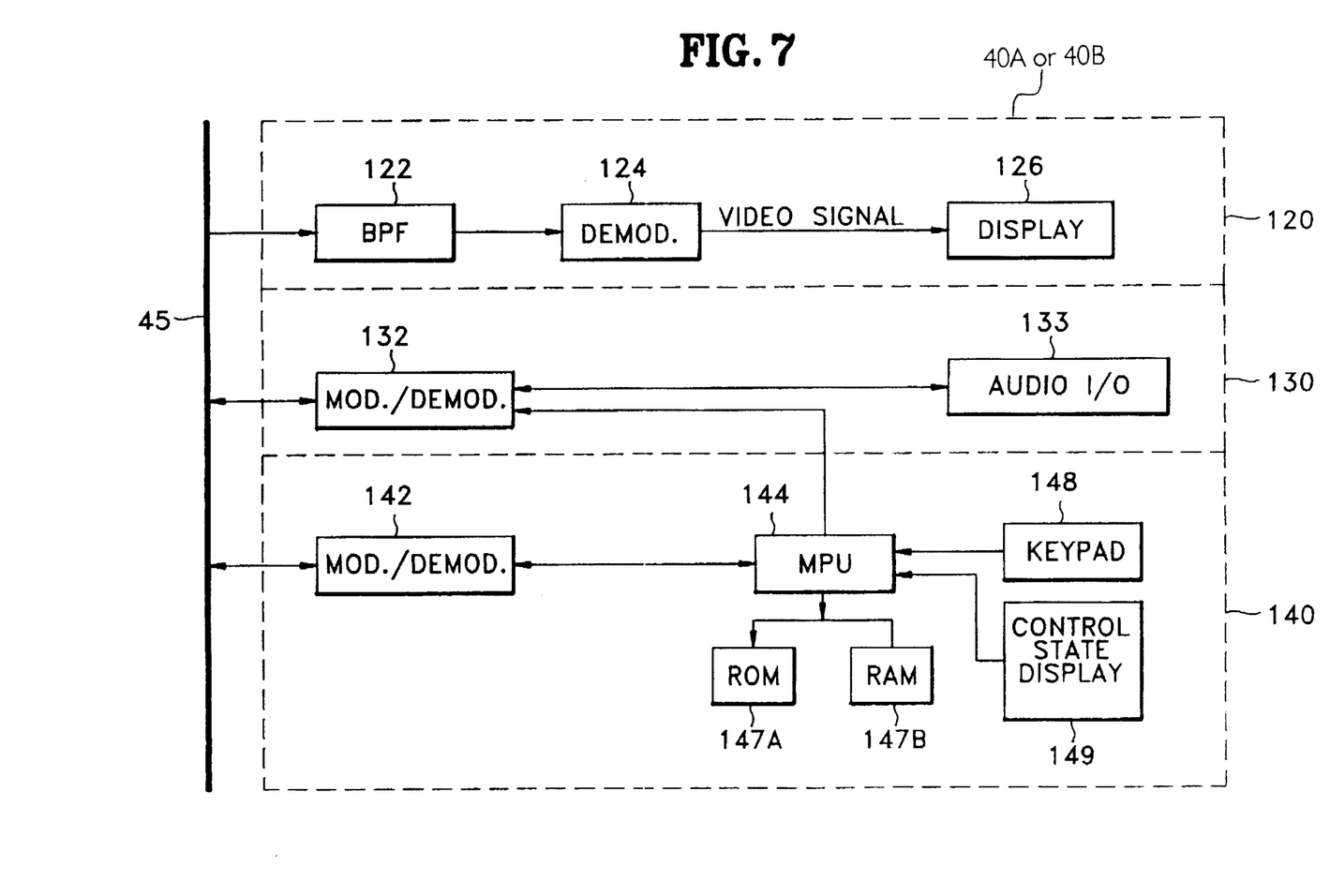
FIG. 7 is a detailed block diagram of the gate guard post interphone of FIG. 2.

FIG. 7 is a detailed block diagram of gate guard post interphone 40A or 40B of FIG. 2. The gate guard post interphone comprises a video signal processor 120, an audio signal processor 130 and a control signal processor 140.

Video signal processor 120 is connected with second coaxial line 45 to receive the signal of the 3.55 MHz frequency band of the video channel from public entrance interphones 5, demodulate the received signal and display the demodulated signal on a screen. That is, only the image signal of the 3.55 MHz frequency band of the video channel passes through a bandpass filter (BPF) 122, is demodulated via a demodulator 124. Then, the image signal of the visitor in the public entrance is displayed on the screen by a display 126. Here, according to the number of the public entrances to be supervised, a plurality of video signal processors 120 may be used.

Audio signal processor 130 sets up a communication channel according to PLL data input from an MPU 144 and receives or outputs the audio signal via the set-up communication channel. First, a demodulator/modulator 132 sets up the communication channel according to the PLL data from MPU 144 and demodulates only the audio signal input via second coaxial line 45 of the set-up communication channel. The demodulated audio signal is output via an audio signal input/output device 133. Additionally, the audio signal from audio signal input/output device 133 is modulated into the transmission frequency band according to the set-up communication channel via modulator/demodulator 132 and is output to second coaxial line 45.

Control signal processor 140 performs a control operation according to control data of a predetermined reception control channel input via second coaxial line 45, generates the control data for performing the control operation and outputs the control data to second coaxial line 45 via the predetermined transmission control channel. That is, a modulator/demodulator 142 modulates/demodulates the signal of the predetermined transmission/reception control channel, which is input or output via second coaxial line 45. MPU 144 generates the PLL data for setting up the communication channel and outputs the generated data to modulator/demodulator 132. Also, MPU 144 generates the control signal according to a key input from a keypad 148, outputs the generated signal to modulator/demodulator 142 and outputs control state data for displaying the control state to a control state display 149. Here, a ROM 147A and a RAM 147B are used for storing information such as the operating program of MPU 144, initial set-up data and data generated during program operation. Thus, the concierge sets up a place for requesting the call using keypad 148 and controls the opening or closing of the public entrances.

Figure 8:
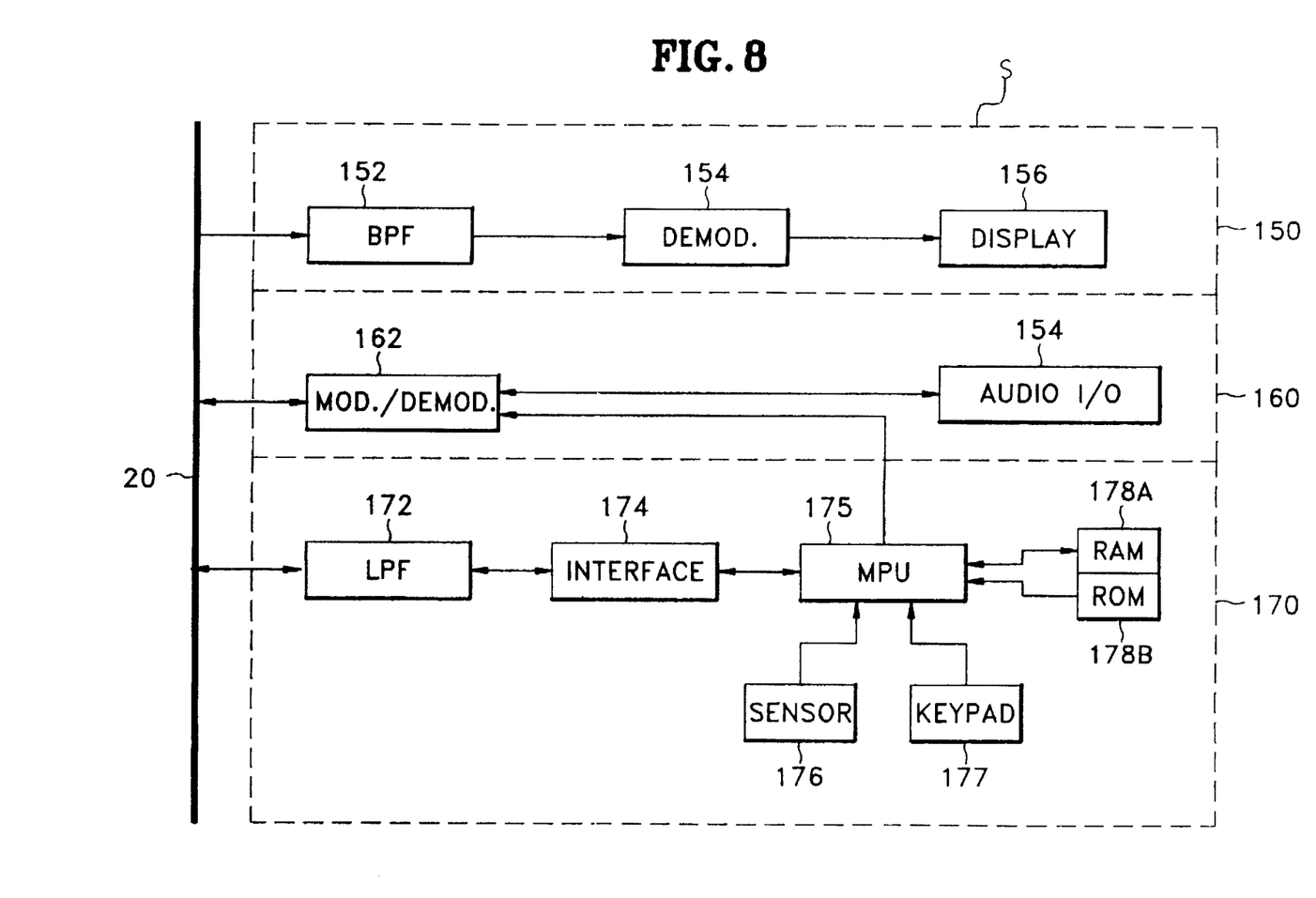
FIG. 8 is a detailed block diagram of a household interphone of FIG. 2.

FIG. 8 is a detailed block diagram of a household interphone of FIG. 2. The household interphone comprises a video signal processor 150, an audio signal processor 160 and a control signal processor 170.

Video signal processor 150 is connected with first coaxial line 20 to receive the signal of the 3.55 MHz frequency band of the video channel from public entrance interphone 5, demodulate the received signal and display the signal on a screen. That is, only the image signal of the 3.55 MHz frequency band of the video channel is passed by bandpass filter 152, and is demodulated by demodulator 154. Then, the image signal of the visitor in the public entrance is displayed on the screen via a screen display 156.

Audio signal processor 160 sets up a communication channel according to PLL data input from an MPU 175 and receives and outputs the audio signal via the set-up communication channel. A modulator/demodulator 162 sets up the communication channel according to the PLL data from MPU 175 and demodulates only the audio signal input from coaxial line 20 of the reception frequency band corresponding to the set-up communication channel. The demodulated audio signal is output via an audio signal input/output device 154. Additionally, the audio signal from audio signal input/output device 154 is modulated into the transmission frequency band according to the set-up communication channel via modulator/demodulator 162 and is output to first coaxial line 20.

Control signal processor 170 generates the PLL data for setting up the communication channel according to the 9600 baud asynchronous serial signal input from first coaxial line 20 and outputs the corresponding 9600 baud asynchronous serial signal for requesting a call to first coaxial line 20. That is, only the 9600 baud asynchronous serial signal from the corresponding block controller 30A or 30B among the signals input via first coaxial line 20 is passed through a low-pass filter 172 input to MPU 175 via an interface 174. MPU 175 generates the PLL data for setting up the communication channel in response to the asynchronous serial signal and outputs the generated PLL data to modulator/demodulator 162, and generates control data corresponding to the signal (household information, particularly, safety information regarding gas, electricity, fire, and break-ins) detected from various sensors 176 in the household. Also, MPU 175 generates control data for requesting the call according to the key input signal of a keypad 177. Interface 115 generates the corresponding 9600 baud asynchronous serial signal according to the control data and outputs the signal to first coaxial line 20 via low-pass filter 116. Here, the signal detected from sensors 176 is transmitted to gate guard post interphone 40A or 40B so that a proper action can be taken when no resident is home within the household.

It should be understood from the above description of the invention in connection with FIGS. 2–8, that a reception frequency band of 112.705–117.825 MHZ is derived by frequency converter 55 from a transmission frequency band of 30–35.12 MHZ by, for example, dividing a predetermined frequency band into the transmission and reception frequency bands or up-converting the transmission frequency band. The transmission and reception frequency bands are divided into a plurality of channels each having a predetermined bandwidth of, for example, 20 KHz, wherein each household interphone S is initially assigned a transmission channel and a corresponding reception channel in order to enable each household to communicate with a guard house, 40A or 40B, over its assigned channel. Additionally, each public entrance interphone 5 is initially assigned a transmission channel and a corresponding reception channel in order to enable communication between the public entrance and the guard house, 40A or 40B, over the assigned channel. Accordingly, the system is initially set up to have a plurality of assigned channels and a plurality of unassigned channels. The assigned channels enable the concierge at the guard house to identify which interphone is being used to communicate with the guard house. Further, the households are grouped in blocks, wherein each block has a corresponding block controller, 30A or 30B. Thus, the system is also initially set up to provide transmission and reception channels for enabling a call to placed between households in the same block by relaying the call through the corresponding block controller, 30A or 30B. The unassigned or non-allocated channels are used by the central controller 50 for relaying calls between households in different blocks.

As described above, in the collective house interphone system according to the present invention, two or more lines between all households and the gate guard posts are replaced by the coaxial lines so that easy wiring and low cost of construction are guaranteed. Also, the cost for maintenance, repairing and management is lowered due to the simple wiring. The call between many households, between blocks, or between gate guard posts can be freely performed. In addition, it is unnecessary that a concierge be permanently stationed at the public entrances for relaying calls. That is, concierge-less relaying is possible so that cost is reduced. Information, such as elevator status, emergencies, break ins, and gas or electricity status can be transmitted and received.

What is claimed is:

1. A collective house controller for a collective house including a first plurality of households grouped into a plurality of separate blocks, each of said blocks including a plurality of separate public entrances, each respective said public entrance being commonly used by a predetermined number of said plurality of households, said collective house controller comprising:

a plurality of block controller means, each of said block controller means corresponding to respective ones of said plurality of blocks;

a plurality of household interphones installed in different ones of said plurality of households;

a plurality of public entrance interphones installed at different ones of said plurality of public entrances;

a first coaxial line connecting each said plurality of household interphones to corresponding ones of said plurality of public entrance interphones and to corresponding ones of said block controllers;

central controller means; and a second coaxial line connecting said central controller means to said plurality of block controller means;

said plurality of household interphones transmitting and receiving a plurality of first control signals via said first coaxial line so as to request or respond to a call, and performing the call via a predetermined communication channel allocated thereto;

said central controller means allocating predetermined numbers of communication channels in response to a communication channel allocation request of at least one of said block controller means, and for relaying a call between blocks by allocating non-allocated communication channels in response to a request for a call relay between blocks from said at least one block controller means, by transmitting and receiving second control signals via said second coaxial line;

said block controller means transmitting and receiving said second control signals via said second coaxial line, for relaying the call between blocks by allocating a communication channel not in use among said allocated communication channels to a corresponding one of said plurality of household interphones in response to said request for said call relay between blocks and, in response to first control signals from at least one of said plurality of household interphones, for relaying the call within the block by allocating a communication channel not in use to said corresponding one of said household interphones when there is a request for a call relay within the block, and requesting the call between blocks by generating said second control signals when there is a request for a call relay between blocks.

2. A collective house controller as claimed in claim 1, comprised of predetermined transmission and reception frequency bands each divided into a plurality of said communication channels, each of said communication channels having a predetermined bandwidth.

3. A collective house controller as claimed in claim 2, comprised of said transmission frequency band being 30 MHz–35.12 MHZ, said reception frequency band being 112.705 MHz–117.825 MHZ, and said predetermined bandwidth being 20 KHZ.

4. A collective house controller as claimed in claim 1, comprising said first control signals being asynchronous serial signals.

5. A collective house controller as claimed in claim 2, said central controller means comprising frequency converting means connected with said second coaxial line, for converting said transmission frequency band into said reception frequency band.

6. A collective house controller as claimed in claim 1, said central controller means comprising:

a bi-directional amplifier for bi-directionally amplifying said second control signals input and output via said second coaxial line;

a modulator/demodulator for modulating and demodulating said second control signals bi-directionally amplified by said bi-directional amplifier; and a controller connected with said modulator/demodulator, for allocating said predetermined number of communication channels in response to a communication channel allocation request of at least one of said block controller means, and for relaying the call between blocks by allocating the remaining non-allocated communication channels in response to a request for the call relay between blocks of at least one of said block controller means, by transmitting and receiving said modulated and demodulated second control signals.

7. A collective house controller as claimed in claim 1, each said block controller means comprising:

bi-directional amplifier means connected between said first and second coaxial lines, for bi-directionally amplifying signals input and output via said first and second coaxial lines;

low-pass filter means connected with said first coaxial line, for low-pass-filtering said first control signals;

interface means connected with said low-pass filter, for interfacing the signals input and output via said low-pass filters;

a modulator/demodulator for modulating and demodulating the second control signals input/output via said second coaxial line; and a controller connected with said modulator and demodulator and said interface means, for receiving predetermined communication channels allocated thereto by transmitting and receiving said second control signals to and from said central controller, for relaying the call between blocks by allocating said communication channel not in use among the allocated communication channels to one of said plurality of household interphones by generating said first control signals in response to a request for the call relay between blocks and, in response to said first control signals of said household interphone, for relaying the call within the block by allocating said communication channel not in use to said household interphone when there is a request for the call relay within the block, and requesting the call between blocks to said central controller by generating said second control signals when there is a request for the call relay between blocks.

8. A collective house controller as claimed in claim 1, further comprising at least one gate guard post interphone installed at a gate guard post and connected with said second coaxial line, for requesting and responding to a call by transmitting and receiving said second control signals, and for performing a call by receiving an allocated one of said communication channels.

9. A collective house controller as claimed in claim 7, comprising said modulator/demodulator modulating an asynchronous serial signal into a transmission frequency band and demodulating a reception frequency band into said asynchronous serial signal.

10. A collective house controller for a collective house including a plurality of households grouped into at least one block with said block including at least one public entrance commonly used by a predetermined number of said plurality households, said collective house controller comprising:

a plurality of household interphones installed in different ones of a plurality of said households;

block controller means for relaying calls between said household interphones in said block;

central controller means;

a public entrance interphone installed at said public entrance for enabling a call to be made from said public entrance to at least one of said household interphones;

a first coaxial line connecting each of said household interphones to said public entrance interphone and to said block controller; and a second coaxial line connecting said central controller means to said block controller means;

said central controller means establishing a transmission frequency band and a reception frequency band for enabling communication over a plurality of transmission and reception channels within said transmission and reception frequency bands, one each of said transmission and reception channels being dedicated to providing control signals over said first and second coaxial lines.

11. The collective house controller as set forth in claim 10, further comprising a gate guard post interphone installed at a gate guard post and connected with said second coaxial line.

12. The collective house controller as set forth in claim 10, said central controller means comprising:
frequency converter means connected to said second coaxial line for converting said transmission frequency band into said reception frequency band; and
central processing means for dividing said transmission frequency band into said plurality of transmission channels and for dividing said reception frequency band into said plurality of reception channels.

13. The collective house controller as set forth in claim 10, said block controller means comprising:
a plurality of block controllers, each said block controller performing a control communication with said public entrance interphone and said household interphones using carrier sense multiple access with collision detection and a baseband alternate mark inversion waveform.

14. The collective house controller as set forth in claim 13, said central controller means allocating predetermined different ones of said transmission and reception channels to each of said block controllers for relaying calls between households of the same block, and when additional transmission and reception channels are required from said block controllers for relaying a call between households in separate blocks, allocating at least one non-allocated transmission and reception channel to said block controllers.

15. The collective house controller as set forth in claim 10, said public entrance interphone comprising:
a control signal processor for generating phase-locked loop data in response to a first control signal received from said block controller means via said first coaxial line;
an audio signal processor connected to said first coaxial line for establishing an audio communication channel over said first coaxial line by connecting an audio input and output means to one of said transmission channels and one of said reception channels in response to said phase-locked loop data; and
a video signal processor for modulating an image signal of a visitor into a predetermined frequency band of a video channel for output over said first coaxial line.

16. The collective house controller as set forth in claim 15, said control signal processor comprising:
a keypad generating a key input signal in response to activation of at least one key on said keypad by said visitor for requesting a call;
microprocessor means for generating call data in response to said key input signal;
an interface converting said call data into an output asynchronous serial signal;
a low pass filter for passing said output asynchronous serial signal for transmission over said first coaxial line to said block controller means;
said low pass filter filtering said first control signal received from said first coaxial line and providing said first control signal to said microprocessor means via said interface;
said microprocessor means generating said phase-locked loop data in response to said first control signal; and
a public entrance access means for opening and closing the public entrance in response to a latching signal output by said microprocessor means in response to said first control signal.

17. The collective house controller as set forth in claim 15, said audio signal processor comprising modulation/demodulation means responsive to said phase-locked loop data.

18. The collective house controller as set forth in claim 16, said audio signal processor comprising modulation/demodulation means responsive to said phase-locked loop data.

19. The collective house controller as set forth in claim 15, said video signal processor comprising:
a camera generating said image signal;
a modulator modulating said image signal into a 3.55 MHz frequency band;
a high frequency amplifier amplifying the modulated image signal; and
a bandpass filter coupled between said high frequency amplifier and said first coaxial line.

20. The collective house controller as set forth in claim 10, each said household interphone comprising:
a control signal processor generating phase-locked loop data in response to a first control signal received from said block controller means via said first coaxial line;
an audio signal processor connected to said first coaxial line and establishing an audio communication channel over said first coaxial line by connecting an audio input and output stage to one of said transmission channels and to one of said reception channels in response to said phase-locked loop data; and
a video signal processor demodulating an image signal of a visitor provided by a camera stationed at said public entrance, said image signal having been modulated into a predetermined frequency band of a video channel and transmitted over said first coaxial line.

21. The collective house controller as set forth in claim 20, said control signal processor comprising:
a keypad generating a key input signal in response to activation of at least one key on said keypad for requesting a call;
microprocessor means for generating call request control data in response to said key input signal;
an interface converting said call request control data into an output asynchronous serial signal;
a low pass filter for passing said output asynchronous serial signal for transmission over said first coaxial line to said block controller means;
said low pass filter filtering said first control signal received as an input asynchronous serial signal from said first coaxial line and for providing said first control signal to said microprocessor means via said interface;
said microprocessor means generating said phase-locked loop data in response to said first control signal; and
sensor means for sensing a selected condition within one of said households and generating an alert signal in response to an abnormality in said household condition, said microprocessor means generating sensor control data in response to said alert signal; and
means for transmitting said sensor control data being output as an asynchronous serial signal to said first coaxial line via said interface and said low pass filter.

22. The collective house controller as set forth in claim 20, said audio signal processor comprising modulation/demodulation means responsive to said phase-locked loop data.

23. The collective house controller as set forth in claim 21, said audio signal processor comprising modulation/demodulation means responsive to said phase-locked loop data.

24. The collective house controller as set forth in claim 20, said video signal processor comprising:
   a band pass filter passing a 3.55 MHz frequency band of said video channel;
   a demodulator recovering said image signal by demodulating said 3.55 MHz frequency band passed by said band pass filter; and
   display means for displaying said recovered image signal.

25. The collective house controller as set forth in claim 10, said block controller means comprising:
   bi-directional amplifier means connected between said first and second coaxial lines, and amplifying attenuated bi-directional signals;
   low-pass filter means for low-pass-filtering asynchronous signals received over said first coaxial line;
   interface means providing an interface between said low-pass filters and microprocessing means, said interface means converting said asynchronous signals to first control signals, and converting first control signals to asynchronous signals; modulation/demodulation means for modulating and demodulating second control signals, said second control signals being received and transmitted as asynchronous signals over said second coaxial line; and
   said microprocessing means being connected to said modulation/demodulation means and to said interface means, for determining which of said transmission and reception channels are allocated to said block in response to said second control signals, and for responsively establishing communication between said public entrance interphone and one of said household interphones and between one of said household interphones and another of said household interphones in response to said first control signals over allocated ones of said transmission and reception channels.

26. The collective house controller as set forth in claim 13, each said block controller comprising:
   bi-directional amplifier means connected between said first and second coaxial lines, for amplifying attenuated bi-directional signals;
   low-pass filter means for low-pass-filtering first control signals, said first control signals being received and transmitted as asynchronous signals over said first coaxial line;
   interface means providing an interface between said low-pass filters and microprocessing means;
   modulation/demodulation means for modulating and demodulating second control signals, said second control signals being received and transmitted as asynchronous signals over said second coaxial line; and
   said microprocessing means being connected to said modulation/demodulation means and said interface means, for determining which of said transmission and reception channels are allocated to a block in response to said second control signals, and for responsively establishing communication between said public entrance interphone and one of said household interphones and between one of said household interphones and another of said household interphones in response to said first control signals over allocated ones of said transmission and reception channels.

27. The collective house controller as set forth in claim 26, at least one of said microprocessing means requesting a call relay between a corresponding household interphone and a household interphone corresponding to a separate block by transmitting call request data as said second control signals to said central controller means.

28. The collective house controller as set forth in claim 27, said central controller means, in response to said call request data, allocating a non-allocated transmission channel and a non-allocated reception channel to said block controllers to enable relaying of said call between said corresponding household interphone and said household interphone corresponding to said separate block.

29. The collective house controller as set forth in claim 11, said guard post interphone comprising:
   a control signal processor generating phase-locked loop data in response to a second control signal received from said block controller means via said second coaxial line;
   an audio signal processor connected to said second coaxial line and establishing an audio communication channel over said second coaxial line by connecting an audio input and output means to one of said transmission channels and one of said reception channels in response to said phase-locked loop data; and
   a video signal processor demodulating an image signal of a visitor provided by a camera stationed at said public entrance, said image signal having been modulated into a predetermined frequency band of a video channel and transmitted over said first coaxial line.

30. The collective house controller as set forth in claim 29, said control signal processor comprising:
   modulation/demodulation means for modulating and demodulating control data, said control data being received and transmitted as asynchronous signals over said second coaxial line;
   microprocessing means generating said control data in response to a key input signal from a keypad and receiving said control data demodulated by said modulation/demodulation means; and
   a control state display displaying sensor states of sensors in each said household in response to said control data received by said microprocessing means.

31. The collective house controller as set forth in claim 30, said sensor states providing an indication of an abnormal condition sensed within at least one of said households.

32. The collective house controller as set forth in claim 29, said audio signal processor comprising modulation/demodulation means responsive to said phase-locked loop data.

33. The collective house controller as set forth in claim 29, said video signal processor comprising:
   a band pass filter passing a 3.55 MHz frequency band of said video channel;
   a demodulator recovering said image signal by demodulating said 3.55 MHz frequency band passed by said band pass filter; and
   display means for displaying said recovered image signal.

34. A collective house control method for a collective house including a plurality of households, grouped into at least one block with said block including a block controller and at least one public entrance interphone at a public entrance commonly used by a predetermined number of said plurality households, each household including a household interphone, said method comprising the steps of:
   connecting said block controller, said public entrance interphone and said household interphones to each other by a single coaxial line;

connecting a central controller and a gate guard post interphone to said block controller by a second single coaxial cable;

establishing a plurality of transmission channels and a plurality of reception channels;

allocating a number of said transmission channels and said reception channels to said block; and designating one of said transmission channels and one of said reception channels as transmission and reception control channels for transmitting and receiving first control data.

35. The method as set forth in claim 34, said step of establishing a plurality of transmission channels and a plurality of reception channels comprising the steps of:

dividing a predetermined frequency band into a transmission frequency band and a reception frequency band; dividing said transmission frequency band into said plurality of transmission channels; and dividing said reception frequency band into said plurality of reception channels.

36. The method as set forth in claim 34, said step of establishing a plurality of transmission channels and a plurality of reception channels comprising the steps of:

establishing a transmission frequency band;

converting said transmission frequency band into and a reception frequency band;

dividing said transmission frequency band into said plurality of transmission channels; and dividing said reception frequency band into said plurality of reception channels.

37. The method as set forth in claim 34, said step of establishing a plurality of transmission channels and a plurality of reception channels comprising the steps of:

dividing a predetermined frequency band into a transmission frequency band and a reception frequency band;

selecting a desired channel bandwidth;

dividing said transmission frequency band by said channel bandwidth to establish said plurality of transmission channels; and dividing said reception frequency band by said channel bandwidth to establish said plurality of reception channels.

38. The method as set forth in claim 34, further comprising the step of:

allocating different ones of said block allocated transmission and reception channels to each said public entrance interphone and household interphone.

39. The method as set forth in claim 34, further comprising the step of:

allocating a non-allocated one of said plurality of transmission and reception channels to one of said households when said one of said households requests a call relay to a household in a separate block of said collective house.

* * * * *